United States Patent Office 2,912,456
Patented Nov. 10, 1959

2,912,456
NITRATED BUTYLPHENYL ETHERS OF POLYGLYCOLS

James H. Fookes, Hope, Mich., assignor to The Dow Chemical Company, Midland, Mich., a corporation of Delaware No Drawing. Application January 18, 1957
Serial No. 634,837
15 Claims. (Cl. 260—466)

This invention relates to nitrated o-sec.-butylphenyl ethers of polyoxyalkylene glycols.

The compounds of the invention have the formula

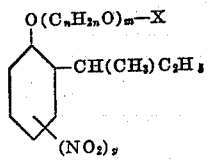

wherein $n$ is an integer in the range 2 to 3, $m$ is an integer in the range of about 2 to 10, X is H, $NO_2$ or $CH_3CO$ and $y$ is 1 to 2.

Compounds having the formula shown above are readily made by nitration of the appropriate o-sec.-butylphenyl ethers or ether acetates. The ethers may be obtained by the reaction of o-sec.-butylphenol with the appropriate alkylene oxides in the presence of an alkali catalyst. The ether acetates are readily made by acetylating the ethers.

All the new compounds are biologically active, being particularly useful as herbicides, plant defoliants and parasiticides. For these uses they are unique in that they combine the phytotoxic and parasiticidal properties of the nitrophenols with the surfactant properties of the polyoxyalkylene glycol ethers. The latter properties enhance the former in the new compounds by making the compounds more readily emulsifiable, thus facilitating their incorporation into water-based sprays, and by enabling them more readily to wet and penetrate surfaces to which they are applied. The latter property is particularly valuable in herbicides and defoliants because most plants have a wax-like, water-repellent surface on their leaves and the applied material must wet and penetrate this surface in order to be absorbed into the plant where it can exert its effect.

Procedures for reacting alkylphenols with alkylene oxides are well known. Thus, o-sec.-butylphenol may be reacted with 2 to about 10 molar equivalents of ethylene or propylene oxide, this reaction being suitably conducted in the presence of a catalytic amount of caustic alkali or other suitable catalyst. The o-sec.-butylphenyl polyoxyalkylene glycol mono-ether thus obtained or its acetate is then nitrated.

The conditions used in the nitration step determine how many nitro groups are thereby inserted into the molecule. Cold, dilute nitric acid yields the mono-nitrophenyl derivative while cold fuming acid yields the dinitrophenyl ether. In the latter case the OH of the polyglycol is converted to the nitrate ester. This ester is easily hydrolyzed with alcoholic potash to yield the 2-sec.-butyl-x-dinitrophenyl polyoxyalkylene glycol mono-ether. These reactions may be schematically represented as follows (R is the sec.-butyl radical):

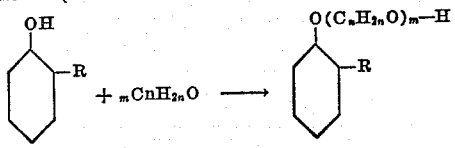

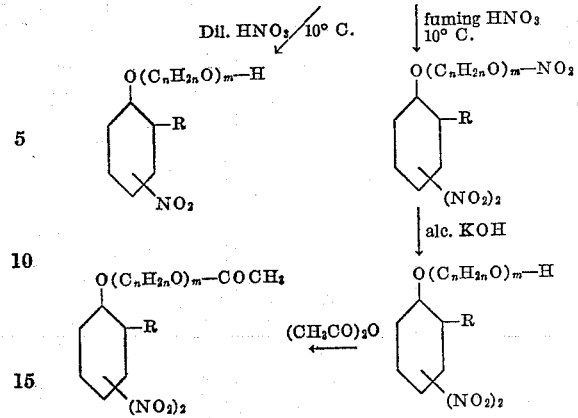

The mononitro compounds are believed to be a mixture of the 4- and 6-nitro isomers while the dinitro compounds are believed to be predominantly or exclusively the 4,6-dinitrophenyl ethers.

The preparation and properties of some typical compounds included in the invention are more fully described in the following examples.

In screening the compounds shown in the examples and related materials for herbicidal and plant defoliant properties, the compound to be tested was made up into a water spray containing 0.4 percent of the active ingredient and this spray was applied to the test plant. The results were expressed as percentage of the leaves killed by the spray. In the following examples the test plant was *Lycopersicum esculentem*.

*Example 1.—Nitro-2-sec.-butylphenyl ether of deca-oxypropylene glycol* o-sec.-Butylphenol was reacted with 10 mols of propylene oxide in the presence of caustic alkali catalyst to form the o-sec.-butylphenyl ether of deca-oxypropylene glycol.

A mixture of 730 g. of the glycol ether, 600 g. of acetic anhydride and 60 g. of sodium acetate was refluxed 6 hours. The product was then dumped on ice, the oil layer salted out with sodium acetate, separated, washed with cold water and dried under vacuum. The acetylated product was 629 g. of oil.

The acetate was converted to the sulfate by adding 200 g. of acetate to 106 ml. of concentrated sulfuric acid and stirring the mixture for 2 hours at 50 degrees C. The product was then diluted with 150 ml. of water and added to a solution of 80 g. of ammonium nitrate in 100 ml. of water. The resulting solution was refluxed 4 hours, after which the oil layer was separated, washed with hot water and dried under vacuum. Yield, 102 g. of a red oil.

In the herbicide and defoliant test, the product killed 100 percent of the leaves.

*Example 2.—Dinitro-2-sec.-butylphenyl ether of deca-oxypropylene glycol nitrate*

Three hundred seventy grams of 2-sec.-butylphenyl ether of deca-oxypropylene glycol were added dropwise over a period of 4 hours to 200 ml. of fuming nitric acid, the temperature being held below 15 degrees C. After the addition was complete, the temperature was allowed to rise to 30 degrees and the mixture was agitated at 30 degrees for 3 hours, after which it was dumped on ice, the product taken up in carbon tetrachloride, washed with cold water, and the solvent and water removed by vacuum stripping. The product was 212 g. of a dark red oil.

In the herbicide and defoliant test, the product killed 90 percent of the leaves.

Example 3.—Dinitro-2-sec.-butylphenyl ether of deca-oxypropylene glycol

Fifty grams of the x-dinitro-2-sec.-butylphenyl ether of deca-oxypropylene glycol nitrate produced according to the method of Example 2 was refluxed for 1 hour with a solution of 5 g. of KOH in 50 ml. of alcohol. The product was washed with water and dried in vacuum. Yield, 34 g. of oil.

In the herbicide and defoliant test, the product killed 90 percent of the leaves.

Example 4.—Dinitro-2-sec.-butylphenyl ether of deca-oxyethylene glycol nitrate Ten mols of ethylene oxide were reacted with one mol of 2-sec.-butylphenol in the presence of a caustic alkali catalyst to form the 2-sec.-butylphenyl ether of deca-oxyethylene glycol.

Three hundred grams of the above glycol were added dropwise to 200 ml. of fuming nitric acid, the temperature being held below 15 degrees C. The addition required 50 min., after which the temperature was raised to 35 degrees and the mixture was stirred for 1 hour at that temperature.

The reaction mixture was dumped on ice and the oil layer was separated, washed with hot (80 degrees C.) water (the product is much more soluble in cold water) and dried by vacuum stripping. Yield, 234 g. of red oil.

Example 5.—Dinitro-2-sec.-butylphenyl ether of deca-oxyethylene glycol

Seventy-five grams of the product from Example 4 were refluxed for 30 min. with a solution of 10 g. of KOH in 100 ml. of alcohol. The reaction mixture was dumped on ice, neutralized with con. HCl, washed with hot water, and dried by vacuum stripping. Yield, 51 g. of red oil.

In the herbicide and defoliant test, the product killed 40 percent of the leaves.

Example 6.—Dinitro-2-butylphenyl ether of diethylene glycol acetate

The 2-sec.-butylphenyl ether of diethylene glycol was prepared by the reaction between 1 m. of 2-sec.-butylphenol and two moles of ethylene oxide in the presence of a caustic alkali catalyst.

The acetate of this glycol ether was made by acetylation, substantially as described in Example 1.

The glycol ether acetate was then nitrated, substantially as described in Example 2, to produce the desired product, a dark red oil.

In the herbicide and defoliant screening test, the product killed 20 percent of the leaves.

By the same general procedures used in the above examples, other related compounds within the scope of this invention may be prepared. In general these compounds have properties and uses similar to those shown above.

It should be recognized that the reaction of a phenol, such as 2-sec.-butylphenol, with 2 to 10 mols of an alkylene oxide produces a mixture of glycol ethers having an average number of oxyalkylene groups corresponding to the number of mols of oxide used. Since it is generally impracticable to isolate pure compounds from such a mixture, and since the particular number of oxyalkylene oxide groups is not critical in the specified range, we prefer to use the mixture as formed rather than the pure compound. Thus, when we refer to a "deca-oxyalkylene" derivative we mean a mixture of such compounds wherein the average number of oxyalklene groups is about ten.

While in the above examples I have used only one alkylene oxide in the preparation of each product, it is possible, and sometimes desirable, to use two or more oxides. In such cases, the oxides may be mixed before use, whereby polyoxyalkylene chains are formed which contain a random sequence of the different oxyalkylene groups, or the individual oxides may be reacted separately, in sequence, whereby polyoxyalkylene chains are formed wherein oxyalkylene groups derived from a given oxide are segregated, within the polyoxyalkylene chain from those derived from other oxides. In the latter case, a significant difference in the properties of the product is observed, depending on the order in which the oxides are added.

I claim:

1. A compound having the formula

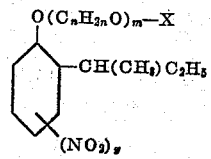

wherein $n$ is an integer in the range 2 to 3, $m$ is an integer in the range 2 to about 10, X is a radical selected from the group consisting of hydrogen, nitro and acetyl radicals and $y$ is an integer in the range 1 to 2.

2. A compound as defined in claim 1 wherein $n$ is 2.
3. A compound as defined in claim 1 wherein $n$ is 3.
4. A compound as defined in claim 1 wherein $m$ is 2.
5. A compound as defined in claim 1 wherein $m$ is about 10.
6. A compound as defined in claim 1 wherein $y$ is 1.
7. A compound as defined in claim 1 wherein $y$ is 2.
8. A compound as defined in claim 1 wherein X is hydrogen.
9. A compound as defined in claim 1 wherein X is a nitro radical.
10. A compound as defined in claim 1 wherein X is an acetyl radical.
11. Nitro-2-sec.-butylphenyl ether of deca-oxypropylene glycol.
12. Dinitro-2-sec.-butylphenyl ether of deca-oxypropylene glycol.
13. Dinitro-2-sec.-butylphenyl ether of deca-oxypropylene glycol nitrate.
14. Dinitro-2-sec.-butylphenyl ether of deca-oxyethylene glycol.
15. Dinitro-2-sec.-butylphenyl ether of diethylene glycol acetate.

References Cited in the file of this patent

UNITED STATES PATENTS

| | | |
|---|---|---|
| 2,291,528 | Bruson et al. | July 28, 1942 |
| 2,724,716 | Dickey et al. | Nov. 22, 1955 |